US012030310B2

(12) United States Patent
Hower et al.

(10) Patent No.: US 12,030,310 B2
(45) Date of Patent: Jul. 9, 2024

(54) MAINTENANCE ROUTINES

(71) Applicant: Hewlett-Packard Development Company, L.P., Spring, TX (US)

(72) Inventors: Jason Hower, Corvallis, OR (US); James R Przybyla, Corvallis, OR (US); Vincent Korthuis, Corvallis, OR (US); Eric T. Martin, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 92 days.

(21) Appl. No.: 17/977,559

(22) Filed: Oct. 31, 2022

(65) Prior Publication Data

US 2024/0140086 A1 May 2, 2024

(51) Int. Cl.
*B41J 2/045* (2006.01)

(52) U.S. Cl.
CPC ......... *B41J 2/04508* (2013.01); *B41J 2/0451* (2013.01); *B41J 2/04513* (2013.01); *B41J 2/04515* (2013.01); *B41J 2/0458* (2013.01)

(58) Field of Classification Search
CPC .. B41J 2/04508; B41J 2/0451; B41J 2/04513; B41J 2/04515; B41J 2/0458
See application file for complete search history.

(56) References Cited

U.S. PATENT DOCUMENTS

2006/0176326 A1* 8/2006 Chou .................. B41J 2/04565 347/9

* cited by examiner

*Primary Examiner* — Justin Seo
(74) *Attorney, Agent, or Firm* — Foley & Lardner LLP

(57) ABSTRACT

According to an example, a method for performing maintenance routines in a plurality of actuators comprises firing a set of actuators at different energies, determining turn on energy values for the set of actuators based on measurements measured via chamber sensors associated with the set of actuators at the different energies, determining turn on energy differences for the set of actuators based on the turn on energy values determined for the set of actuators and threshold turn on energy values associated with the set of actuators, and performing maintenance routines corresponding to the determined turn on energy differences.

15 Claims, 3 Drawing Sheets

MAINTENANCE ROUTINES

BACKGROUND

Printing systems use printheads to provide drop-on-demand ejection of printing fluid droplets. In general, printing systems print images by ejecting printing fluid droplets onto a printing medium (for instance, a sheet of paper or a layer of build material). Over a lifespan of a printhead, a printing fluid dispensing operation carried out by a printhead may result in image quality defects on the printed media.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
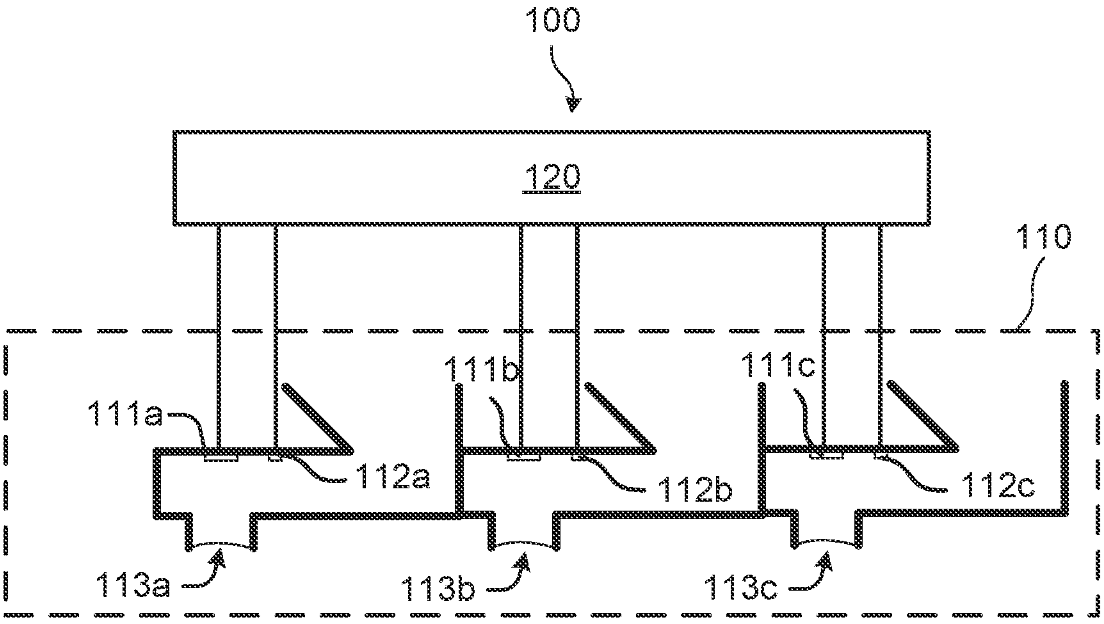
FIG. 1 shows a schematic representation of a printing system including a printhead assembly, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more," "at least," and/or other similar terms may be used in an abundance of caution (and without limiting the interpretation of other terms) to describe any feature, structure, characteristic, and/or the like in the singular, "and/or" is also used to describe a plurality and/or some other combination of features, structures, characteristics, and/or the like. As used herein, the term "includes" means includes but not limited to, the term "including" means including but not limited to. The term "based on" means based at least in part on.

Printing systems are used to dispense drops of printing fluid through a plurality of nozzles. The printing fluid eventually released through the nozzles of a printhead is obtained from one or more print chambers in fluidic communication with the nozzles. When the printhead is not dispensing droplets of printing fluid, the printing fluid is retained in the print chamber due to capillary forces and/or back-pressure acting on the printing fluid within the nozzle passage.

To eject printing fluid drops, printheads may be provided with at least one actuator. Examples of actuators comprise heating elements (such as resistors) and mechanical actuators. For instance, when using an actuator in the form of a heating element, a temperature of the printing fluid within the print chamber in which the heating element is disposed may be increased to dispense a printing fluid drop. Eventually, the temperature increase may cause small volumes of the printing fluid to expand and vaporize. The evaporation of the printing fluid results in the formation of a bubble within the print chamber. The bubble, which may be referred to as a drive bubble, may further expand driving, or ejecting, a printing fluid drop via the nozzle of the printhead. As a printing fluid drop is released, the drive bubble collapses and the print chamber is subsequently replenished with printing fluid.

As used herein, "printing fluid" refers generally to any substance that can be applied upon a substrate by a printing system during a printing operation, including but not limited to inks, primers, fusing agents, overcoat materials (such as a varnish), water, and solvents other than water.

To fire printing fluid drops through a nozzle of a printhead, an actuator associated with the nozzle is set up at a turn on energy value. In an example, the creation of a drive bubble big enough to cause droplets of printing fluid to be ejected through a nozzle may be associated with a threshold turn on energy value. If the actuator is activated at firing energies below the threshold turn on energy value, the firing will not result in a printing fluid drop and the heat generated will be absorbed by the printing fluid and/or a component of the printhead (e.g., printhead die). On the other hand, if the actuator is activated at a firing energy beyond the threshold turn on energy value, the firing will result in a printing fluid drop and the excess of energy with respect to the threshold firing energy value will be absorbed into the printhead and/or the printing fluid. Eventually, these temperature increases resulting from firing of an actuator may impact a lifespan of the printhead and/or a printing operation being conducted by the printing system, thereby leading to an early replacement or changes in the physical properties of the printing fluid (for instance, viscosity or density). Hence, to effectively fire an actuator, the actuator may be activated at a firing energy corresponding to a minimum firing energy that results in dispensing the printing fluid drop while not resulting in an excess of heat. In some examples, the minimum firing energy that results in dispensing the printing fluid drop while not resulting in an excess of heat is referred to as a threshold turn on energy value.

To modify a firing energy an actuator, a firing voltage or a firing pulse width for the actuator may be adjusted. However, over the lifespan of a printhead, a threshold turn on energy value associated with the actuator may change as a result of a change in the efficiency of the actuator and/or presence of external elements within a print chamber in which the actuator is located. Eventually, the change in efficiency of the actuator may negatively impact the performance of the printhead including the actuator, thereby leading to image quality defects on the printed medium.

In some examples, a condition of a print chamber in fluidic communication with an actuator may also affect the performance of a printhead. For instance, a nozzle associated with an actuator may get blocked. In some cases, during the normal operation of the printing system may solidify small volumes of printing fluid, such as in response to exposure of printing fluid in a nozzle meniscus to air, thereby resulting in the clogging of the nozzle. As a result, nozzle clogs may adversely affect the formation and the subsequent release of printing fluid drops.

In other examples, the performance of a printhead including an actuator in the form of a heating element may be impacted by the presence of kogation. As used herein, the term "kogation" or "koga" refers to a deposit of dried ink on a heating element of a printhead (for instance, a thermal inkjet printhead). The buildup of kogation may be experienced when firing the heating element (for instance, for creating a net flow of printing fluid along a print chamber or for ejecting drops of printing fluid through a nozzle associated with the heating element). Among others, kogation may result in a reduction of the efficiency of the heating element and a nozzle failure. In particular, kogation may affect the drive bubble formation, thereby leading to variations in ejected drop qualities, such as drop velocity. Eventually, the firing of a heating element experiencing kogation may result in image quality defects on a printed medium.

In some other examples, the performance of a printhead may be affected by a decrease in the efficiency resulting from presence of oxidation on the actuator. In some examples, an oxidated actuator may have a lower efficiency compared to a non-oxidated actuator, and this lower efficiency may lead to changes in the ejected drop qualities, as explained above. Eventually, oxidation may result in a reduced image quality for the printed media.

To mitigate the negative effects associated with the above-mentioned factors, a printhead may conduct maintenance routines to recover actuators under defective conditions. In an example, a clogged nozzle of a printhead may be recovered by firing the actuator in a spitting operation and subsequently wiping the nozzle using a wiper. In other examples, a printhead experiencing kogation may be recovered via a koga clean operation in which the actuator is fired at high energy to burn off the dried ink on the actuator. On the other hand, an oxidated actuator may not be recovered via a maintenance routine involving firing the actuator. Instead, a maintenance routine to recover an oxidated actuator may involve adjusting a firing energy at which the actuator is to be fired to dispense a printing fluid drop over the subsequent firing operations. Eventually, a maintenance routine to improve the performance of an oxidated actuator may involve replacing the printhead including the actuator with a different printhead.

Disclosed herein are examples of methods, printing systems, and computer-readable media comprising instructions to maintain actuators used in a printing fluid dispensing operation under operative conditions.

To determine a condition of an actuator, chamber sensors may be used for detecting presence or absence of a drive bubble in a print chamber in which the actuator is disposed. In particular, due to printing fluid present in the print chamber will offer less electrical impedance than air or vapor, the presence or absence of the drive bubbles may be determined via chamber sensors by measuring electrical measurement variations. In an example, the presence of a drive bubble may be determined based on impedance values measured by a chamber sensor, the impedance values being indicative of a size of a drive bubble in the print chamber. In some other examples, chamber sensors may be used to determine properties of drive bubbles generated as a result of a firing of the actuator. Examples of properties comprise a size of a drive bubble, time of formation for the drive bubble, time of collapse for the drive bubble, rate of formation, rate of collapse, and a time in which the drive bubble is present in the print chamber.

Throughout the description, the term "chamber sensor" will be used to refer to sensors capable of determining a change in an electrical parameter through a sensed medium within a print chamber. In some examples, sensors may determine a variation in the impedance with respect to a threshold value, depending on the current passing through a sensed medium, which is the printing fluid in the print chamber. In an example, a chamber sensor may be in the form of a cavitation plate disposed on top of the actuator. However, in other examples, alternative locations may be possible, such as a chamber sensor remote from the actuator. Chamber sensors may be used for determining properties of drive bubble generated in a print chamber. Examples of properties of a drive bubble include at least one of a size of a drive bubble, time of formation for the drive bubble, time of collapse for the drive bubble, rate of formation, rate of collapse, and a time in which the drive bubble is present in the print chamber.

In some examples, a chamber sensor may also be used to determine whether at any one or more specific instances of time a drive bubble has formed or not. For example, any blockage in a nozzle of a printhead will also affect the formation of the drive bubble at any specific instance in time. In that case, if at a particular instance of time a drive bubble has not formed, a controller operatively connected to the chamber sensor may determine the nozzle is blocked and not working in an intended manner. Similarly, a chamber sensor may also determine whether, at a different instance of time, the drive bubble has collapsed or not. In such a case, the printing fluid has been replenished and will be detected by the chamber sensor. If the drive bubble had not collapsed at the predetermined instance of time, a controller connected to the chamber sensor may determine that the nozzle has become defective due to the presence of an external element in at least one of the nozzles, the print chamber, and on the actuator, by way of example.

According to some examples, maintenance routines may be conducted in in view of the measurements made by a chamber sensor associated with an actuator. Examples of maintenance routines comprise firing the actuators at over energy levels, transmitting signals indicative of printhead replacement, and performing spitting operations.

Referring now to FIG. 1, a printing system 100 comprising a printhead assembly 110 and a controller 120 is shown. The printhead assembly 110 may be used for in a printing operation in which printing fluid is ejected on print media through nozzles 113*a*, 113*b*, and 113*c* of the printhead assembly 110. The printhead assembly 110 comprises a plurality of actuators and a plurality of chamber sensors, each of the chamber sensors being associated with a respective actuator. For instance, with respect to a first nozzle 113*a*, a first print chamber includes a first actuator 111*a* of the plurality of actuators and a first chamber sensor 112*a* remote from the first actuator 111*a*. With respect to a second nozzle 113*b*, a second print chamber includes a second actuator 111*b* of the plurality of actuators and a second chamber sensor 112*b* remote from the second actuator 111*b*. With respect to a third nozzle 113*c*, a third print chamber includes a third actuator 111*c* of the plurality of actuators and a third chamber sensor 112*c* remote from the third actuator 111*c*.

The controller 120 of the printing system 100 is operatively connected to the plurality of actuators and the plurality of chamber sensors. Chamber sensors 112*a*, 112*b*, and 112*c* may be used for determining a condition of an actuator based on measurements associated with properties of drive bubble generated upon firing the actuators 111*a*, 111*b*, and 111*c*. Based on the condition determined for each of the actuators, the controller 120 may control any of the actuators 111*a*, 111*b*, and 111*c* to perform a maintenance routine. In some examples, a maintenance routine may be selected based on a turn on energy difference with respect to a threshold turn on energy value.

As used herein, the term "threshold turn on energy value" refers to a minimum turn on energy value at which a firing of an actuator results in a drive bubble big enough to cause droplets of printing fluid to be ejected via a nozzle, such as nozzles 113*a*-113*c*. Threshold turn on energy values may be set based on factory data or may be determined in a calibration operation carried out by a printing system when inserting new printheads including actuators. In an example, threshold turn on energy values for the actuators of a printhead assembly may be determined in an out of the box calibration routine performed by the printing system 100.

As previously explained, a threshold turn on energy value for an actuator may shift as a result of a clogged nozzle, an actuator experiencing kogation, and an actuator experiencing oxidation. Accordingly, when determining that a current turn on energy value for any of the actuators 111*a*, 111*b*, and 111*c* of the printhead assembly 110 is different than the threshold turn on energy value, the difference with respect to the threshold turn on energy value may be indicative of any of the factors explained above.

To determine whether to conduct a maintenance routine on any actuator (e.g., actuators 111*a*-111*c*) of the printhead assembly 110, the controller 120 of the printing system 100 is to read calibration data including threshold turn on energy values for the plurality of actuators. In an example, the controller 120 may read the calibration data from a memory of the printing system 100 or a memory operatively connected to the printing system 100. However, in other examples, the calibration data may be remote from the printing system 100, and the controller 120 may read the calibration data from a server over a network (e.g., via the internet). To determine a current turn on energy value for the actuators 111*a*, 111*b*, and 111*c*, the controller 120 is to control a set of actuators of the plurality of actuators to fire at different energies. The set of actuators may include at least one of the actuators 111*a*, 111*b*, and 111*c*. Accordingly, if the set of actuators includes the first actuator 111*a* and the second actuator 111*b*, control the set of actuators to fire at different energies comprises firing the first actuator 111*a* at a plurality of different energies and firing the second actuator 111*b* at a plurality of different energies.

As used herein, the term "control a set of actuators to fire at different energies" refers to control each of the actuators belonging to the set of actuators to fire at a plurality of firing energies. In an example, the plurality of firing energies may correspond to a plurality of predetermined firing energies associated with different conditions of the actuator. In some examples, each of the firing energies at which the set of actuators is fired may be within a predefined firing energy range. Different firing energy ranges may be possible based on a geometry of a print chamber in which the actuator is disposed, a size of actuator, and type of printing fluid within the print chamber.

As the set of actuators is being fired at different energies, chamber sensors associated with the fired actuators may obtain measurements associated with properties of a drive bubble generated by the firing. As explained above, examples of properties of a drive bubble comprise a size of a drive bubble, time of formation for the drive bubble, time of collapse for the drive bubble, rate of formation, rate of collapse, and a time in which the drive bubble is present in the print chamber. The controller 120 of the printing system 100 is to receive sensor data including a plurality of measurements at different energies from the chamber sensors associated with the set of actuators. For instance, if the set of actuators includes the first actuator 111*a* and the second actuator 111*b*, the chamber sensors associated with the set of actuators are the first chamber sensor 112*a* and the second chamber sensor 112*b*. Then, based on the sensor data and the threshold turn on energy values associated with the set of actuators, the controller 120 is to determine turn on energy differences for the set of actuators. Upon determining the turn on energy differences, the controller 120 is to execute maintenance routines corresponding to the turn on energy differences. Examples of maintenance routines include firing actuators, transmitting signals indicative of printhead replacement, or a combination thereof.

In some examples, the execution of maintenance routines may be determined based on a look-up table (LUT). In an example, the controller 120 may be operatively connected to a memory including data in the form of a LUT that correlates turn on energy values determined for actuators to maintenance routines. In some examples, the LUT may receive a turn on energy value determined for an actuator as an input value and may determine a maintenance routine corresponding to the determined turn on energy value as an output value. In some other examples, a plurality of the memory operatively connected to the controller 120 may include a plurality of LUTs, each of the LUT being associated with an actuator of the plurality of actuators.

In other examples, the determination of the turn on energy differences by the controller 120 comprises the controller 120 to determine turn on energy values for the set of actuators and the controller 120 to determine the turn on energy difference as a function of the determined turn on energy values and the respective turn on energy values. As previously explained, the turn on energy value determined for an actuator based on the plurality of measurements made by the chamber sensors corresponds to a minimum amount of firing energy that results in the formation of a drive bubble big enough to dispense healthy printing fluid drops which does not result in image quality defects such as misplaced drops or missing drops. In some examples, the controller 120 may process the sensor data to determine which firing energy values result in a healthy drive bubble by comparing the measurements made by the chamber sensor to a threshold measurement. In an example, the chamber sensor may measure impedance values, and the turn on energy value for the fired actuator may be determined as a firing energy that results in an impedance value greater than a threshold measurement.

In some other examples, the printing system 100 may have to perform more than one maintenance routines to recover an actuator from a defective condition. In some examples, an actuator may have to perform successive firing operations to recover the actuator from clogging or kogation. Similarly, in some examples, supplemental firing and sensing operations may be conducted to determine whether the actuator is experiencing oxidation. In an example, while a supplemental turn on energy value of an actuator is greater than a threshold turn on energy value associated with the actuator, the controller 120 is further to control the actuator to fire at different energies and receive supplemental sensor data including a supplemental plurality of measurements at the different energies. Then, based on the supplemental sensor data, the controller 120 is to determine a supplemental turn on energy difference with respect to the respective threshold turn on energy value, and execute a supplemental maintenance routine involving firing the actuator based on the supplemental turn on energy difference.

In some other examples, when performing supplemental maintenance routines to recover actuators from an abnormal condition, a maximum number of supplemental maintenance routines for an actuator may be set. In an example, the maximum number of supplemental maintenance routines may be set in view of an available time for performing the maintenance routines (e.g., a time in between print jobs, a time available during a startup operation, or a time available over a servicing operation). Also, in some examples, the performance of a number of supplemental maintenance routines greater than a predetermined number of maintenance routines may be indicative of the presence of an oxidated actuator. In some examples, upon the actuator executes a predetermined number of supplemental maintenance routines, the controller 120 may determine that the actuator is experiencing oxidation. To reduce the image quality defects that may be caused by the presence of oxidation, the controller 120 may modify a firing energy at which the actuator is to be fired during a printing fluid dispensing operation by modifying the calibration data or may identify a need to replace a printhead of the printhead assembly upon the actuator executes a predetermined number of maintenance routines. In an example, modify the calibration data comprises setting the supplemental turn on energy value as the threshold turn on energy value associated with the actuator. In this way, the loss of efficiency associated with the oxidation will be compensated in the upcoming printing fluid dispensing operation. In other examples, identify a printhead as a to-be-replaced printhead comprises identifying a printhead of the printhead assembly 110 including the actuator as a to-be-replaced printhead upon the supplemental turn on energy values of a threshold number of actuators of the printhead is greater than a max turn on energy value. As a result, image quality defects in upcoming printing fluid dispensing operations may be prevented. In some examples, the max turn on energy value may correspond to a maximum admissible turn on energy value at which an actuator may be fired without compromising its future performance.

Figure 2:
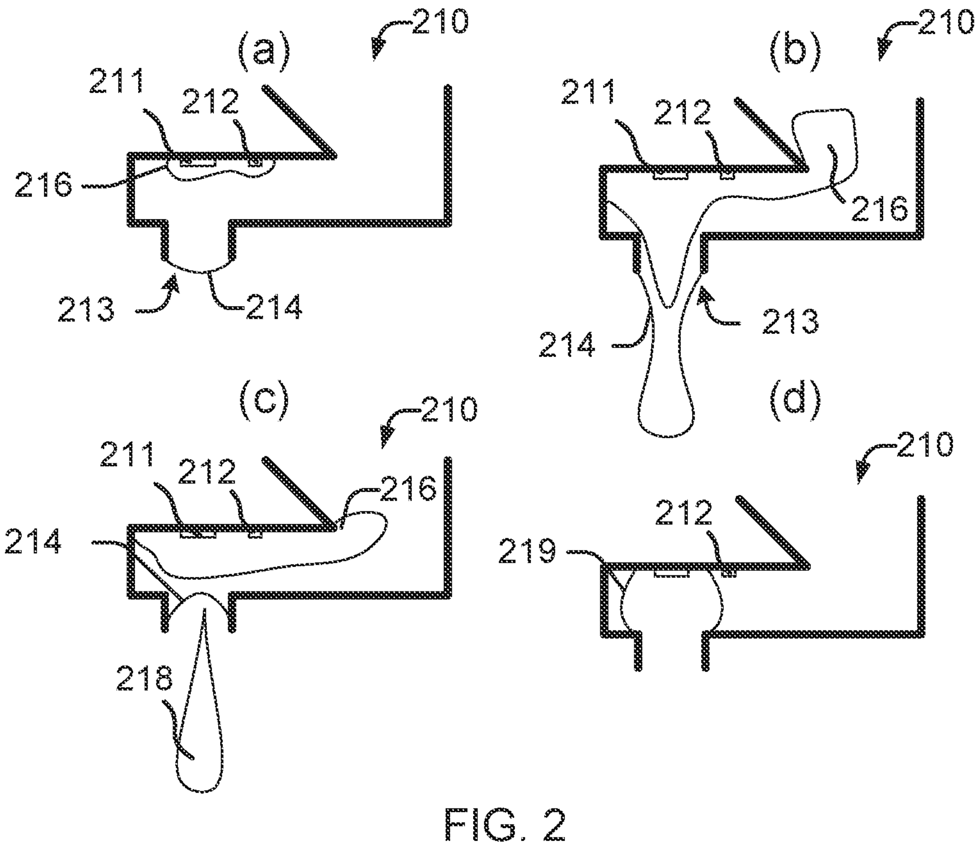
FIG. 2 shows a schematic representation of a printhead assembly over different stages, according to an example of the present disclosure.

Referring now to FIG. 2, a printhead assembly 210 over different stages is shown. The printhead assembly 210 comprises an actuator 211, a chamber sensor 212, and a nozzle 213. The actuator 211 is aligned with the nozzle 213 such that a firing of the actuator 211 at a threshold turn on energy value results in ejecting droplets of printing fluid through the nozzle 213. Through the action of the actuator 211, the chamber sensor 212 may monitor and measure the variations in the measurements due to the formation of the drive bubble 216. As previously explained, a condition of the printhead assembly 210 may be determined by firing the actuator 211 at a plurality of firing energies. In some examples, a printing system (e.g., printing system 100) may include the print assembly 210.

The formation and the collapse of the drive bubble 216 when firing the actuator 211 at a firing energy is illustrated in FIGS. 2(*a*) to 2(*d*). The firing energy may correspond, for instance, to an energy value of the plurality of different energies at which the actuator 211 is fired to determine whether a maintenance routine is to be conducted. FIGS. 2(*a*) and 2(*b*) represent the formation of the drive bubble 216 and FIGS. 2(*c*) and 2(*d*) represent the collapse of the drive bubble 216.

As previously explained, upon firing the actuator 211 at a firing energy, the actuator 211 initiates heating of the ink in a print chamber of the printhead assembly 210. As the temperature of the ink in the proximity of the actuator 211 increases, the ink vaporizes and forms the drive bubble 216 within the print chamber. In FIG. 2(*a*), the expansion of the drive bubble 216 does not cause an ink level 214 to extend beyond the nozzle 213 and the ink is retained within the nozzle 213 due to capillary action. However, as the heating of the ink continues, the drive bubble 216 expands and forces the ink level 214 to extend beyond the nozzle 213, as represented in FIG. 2(*b*).

As the drive bubble 216 expands further, the physical forces arising out of the capillary action will no longer be able to hold the ink level 214, and an ink drop 218 will be formed, as shown in FIG. 2(*c*). Then, the formed ink drop 218 is thus ejected through the nozzle 213, and ink in within the print chamber of the printhead assembly 210 is replenished by the incoming ink flow from a reservoir. At this stage, the actuator 211 ceases to heat the ink. As the ink is replenished, the drive bubble 216 collapses, resulting in an empty space 219, as shown in FIG. 2(*d*). Then, the remaining space in the proximity of the sensor 212 will be restored with ink, which again comes in contact with the sensor 212, as illustrated in FIG. 2(*d*).

Through the creation and subsequent collapse of the drive bubble 216, the chamber sensor 212 may measure a plurality of measurements associated with properties of the drive bubble 216. In some examples, the measurements may correspond to electrical measurements (e.g., impedances or voltages) and properties of the drive bubble 216 may be determined based on the electrical measurements. As previously explained, to effectively form the ink drop 218, a firing energy for the actuator 211 has to be set as a minimum firing energy at which a drive bubble is big enough to cause the healthy ink drop 218 to be ejected. Accordingly, when firing the actuator 211 at different energies, the minimum firing energy at which the drive bubble is big enough to cause healthy drops to be ejected may be determined based on the plurality of measurements made by the chamber sensor 212.

In some examples, the chamber sensor 212 may comprise a drive bubble sensor to measure impedance values and a drive bubble circuitry operatively connected to the drive bubble sensor and the controller of a printing system. As previously explained, the ink within the print chamber of the printhead assembly 210 will offer a certain electrical impedance to a specific electrical current. Typically, mediums such as ink are good conductors of electric current. Consequently, the electrical impedance offered by the ink within the printhead assembly 210 will be low relative to an impedance offered by air or steam (ink vapor) within the drive bubble 216. For instance, as the printhead assembly 210 prepares for ejecting an ink drop, the drive bubble sensor of the chamber sensor 212 may pass a finite electrical current through the ink within the print chamber of the printhead assembly 210. The electrical impedance or the voltage associated with the printhead assembly 210 may be measured through the drive bubble sensor 212. As the drive bubble 216 forms due to the action of the actuator 211, the ink in the proximity may lose contact with the drive bubble sensor. Eventually, as the drive bubble 216 forms, the drive bubble sensor may get completely surrounded by the drive bubble 216. At this stage, since the drive bubble sensor of the chamber sensor 212 is not in contact with the ink, the impedance, and therefore the voltage measured by the drive bubble sensor, will be correspondingly high.

In some examples, impedance measurements measured by a drive bubble sensor may be used for determining turn on energy differences for an actuator. In an example, a controller operatively connected to a drive bubble circuitry may receive sensor data associated with the impedance values measured by a drive bubble sensor. The controller may determine a turn on energy value for the actuator 211 based on the impedance values at the different energies. Based on the determined turn on energy values and a threshold turn on energy value associated with the actuator 211, the controller may determine the turn on energy difference. As previously explained in reference to the printing system 100 of FIG. 1, the controller may execute maintenance routines corresponding to the turn on energy difference determined for the actuator 211.

Although in FIG. 2 the printhead assembly 210 includes an actuator 211 and a chamber sensor 212, it should be noted that in other examples the printhead assembly 210 may include a plurality of actuators and a plurality of chamber sensors, each of the chamber sensors being associated with a respective actuator. Accordingly, when having a plurality of actuators and a plurality of chamber sensors, a turn on energy difference may be determined for a set of actuators of the plurality of actuators, as previously explained in reference to a single turn on energy difference for the actuator 211.

Figure 3:
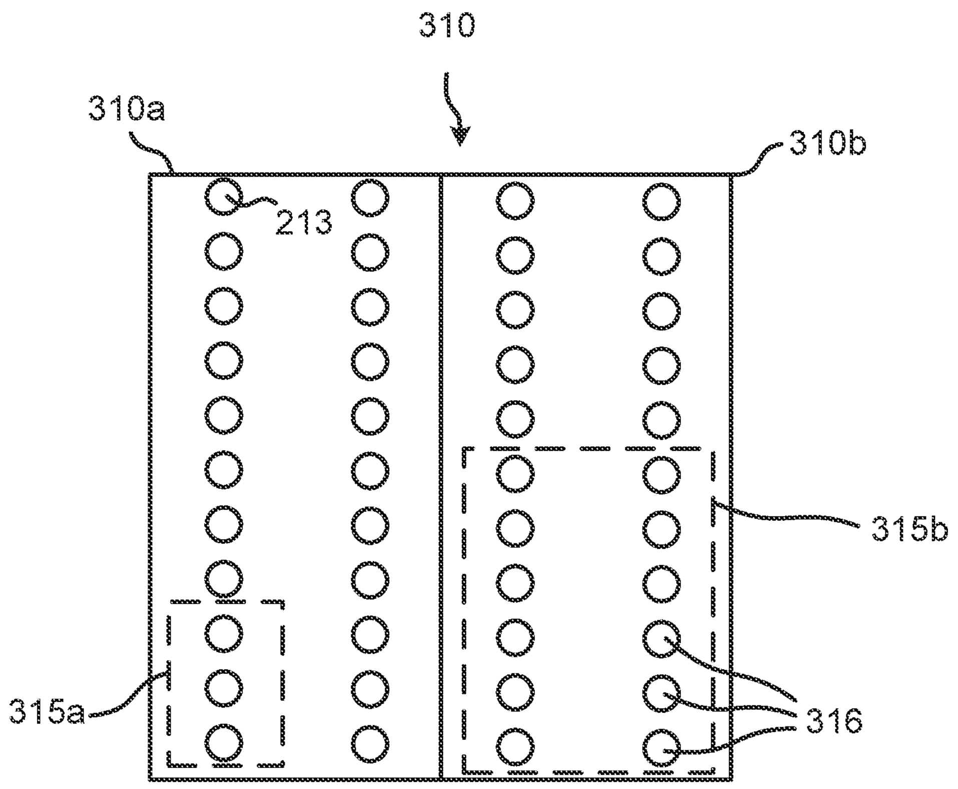
FIG. 3 shows a view of a printhead assembly including a first printhead and a second printhead, according to an example of the present disclosure.

Referring now to FIG. 3, a printhead assembly 310 including a first printhead 310*a* and a second printhead 310*b* is shown. Each of the first printhead 310*a* and the second printhead 310*b* includes a plurality of nozzles 213, each of the nozzles 213 being associated with a respective actuator (not shown in FIG. 3) and a respective chamber sensor (not shown in FIG. 3). As a result, the printhead assembly 310 comprises a plurality of actuators and chamber sensors. In some examples, a printing system (e.g., printing system 100) may include the printhead assembly 310.

To determine a condition of the plurality of actuators within the printhead assembly 310, a controller (not shown in FIG. 3) operatively connected to the actuators may control a set of actuators to fire at different energies. In an example, the set of actuators may be selected from the plurality of actuators based on a selection criterion. Examples of selection criteria comprise a number of firings for each actuator based on historical firing data, a time elapsed since insertion of a printhead including an actuator, and a type of actuator. In the example of FIG. 3, the set of actuators comprises a first group of actuators 315*a* in the first printhead 310*a* and a second group of actuators 315*b* in the second printhead 310*b*.

As previously explained in reference to the printing system 100 of FIG. 1, each actuator of the plurality of actuators may be associated with a respective threshold turn on energy value. To determine whether at least one maintenance routine is to be conducted, the first and second group of actuators 315*a* and 315*b* may be fired at different energies. As the actuators are being fired, chamber sensors associated with the first and second groups of actuators 315*a* and 315*b* may obtain sensor data including a plurality of measurements at the different firing energies. Then, a controller operatively connected to the chamber sensors may determine turn on energy values for the set of actuators based on the sensor data received from the chamber sensors. The controller, based on the threshold turn on energy values associated with the set of actuators (i.e., the first group 315*a* and the second group 315*b* of actuators) and the turn on energy values determined for the set of actuators, may determine turn on energy differences for the set of actuators. As previously explained, the turn on energy differences may be indicative of an abnormal operation of an actuator. For instance, in the printhead assembly 310, abnormal operation may be determined in a sub-group of actuators 316 belonging to the second group of actuators 315*b* in view of the determined turn on energy differences. Accordingly, in some examples, maintenance routines corresponding to the turn on energy differences may be conducted to recover the sub-group of actuators 316, the maintenance routine comprising firing actuators, transmitting signals indicative of printhead replacement, or a combination thereof.

In some examples, types of maintenance routines may be determined in view of the turn on energy difference. In an example, a plurality of ranges of turn on energy differences associated with respective maintenance routines may be defined. For instance, in the sub-group 316, maintenance routines may be selectively performed for each actuator in view of the turn on energy differences. In an example, a first range of turn on energy differences may be associated with a firing of an actuator at an over energy level, a second range of turn on energy differences may be associated with a firing of an actuator at a threshold turn on energy value associated with the actuator, and a third range of turn on energy differences may be associated with a printhead replacement. The first range, the second range, and the third range are different with each other, and may be based on the type of actuator and ink type (e.g., based on resistivity values associated with the type of ink). For instance, in an example, a controller may control a first sub-set having the turn on energy difference within the first range to fire at an over energy level, a second sub-set of actuators having the turn on energy difference within the second range to fire at the threshold turn on energy values associated with the second sub-set of actuators, and to issue a printhead replacement signal for printheads including a third sub-set having the turn on energy difference within the third range of turn on energy values.

As used herein, the term "over energy level" refers to an excess of energy with respect to the threshold turn on energy value associated with an actuator. Firing actuators at over energy levels may burn off dried ink on the actuator (if any). During a koga clean operation, an actuator may be fired at a 115% to 220% of the turn on energy associated with an effective firing operation (i.e., a threshold turn on energy). In some examples, a koga clean operation may involve subsequently firing an actuator at incrementally increasing over energy levels. In between each of the firings, a condition of the actuator may be determined. In this fashion, additional firing operations at high energy values will be reduced, thereby improving the lifespan the printhead including the actuator.

Although the printhead assembly 310 of FIG. 3 comprises two printheads, other examples of printhead assemblies may comprise additional printheads. In an example, a printhead assembly comprises a plurality of printheads, each of the printheads comprising at least one actuator of the plurality of actuators and at least one chamber sensor of the plurality of chamber sensors. Also, in some examples, a printhead assembly may further comprise actuators which are not associated with chamber sensors, and a condition of these actuators may be determined in view of sensor data obtained by chamber sensors associated with a set of actuators of the printhead assembly. Accordingly, in some examples, maintenance routines may be performed in actuators not associated with chamber sensors in view turn on energy differences for a set of actuators associated with chamber sensors.

According to some examples, a method for maintaining actuators under operative conditions may comprise performing maintenance routines corresponding to turn on energy differences determined for a set of actuators. In an example, the method may comprise firing a set of actuators at different energies, determining turn on energy values for the set of actuators based on measurements by chamber sensors associated with the set of actuators at the different energies, determining a turn on energy difference based on the determined turn on energy values and threshold turn on energy values, and performing maintenance routines corresponding to the turn on energy differences. In some examples, determining turn on energy values for the set of actuators may comprise determining firing energies at which firing of the set of actuator results in the formation of a drive bubble big enough to dispense a print drop through a nozzle associated with the fired actuator.

Figure 4:
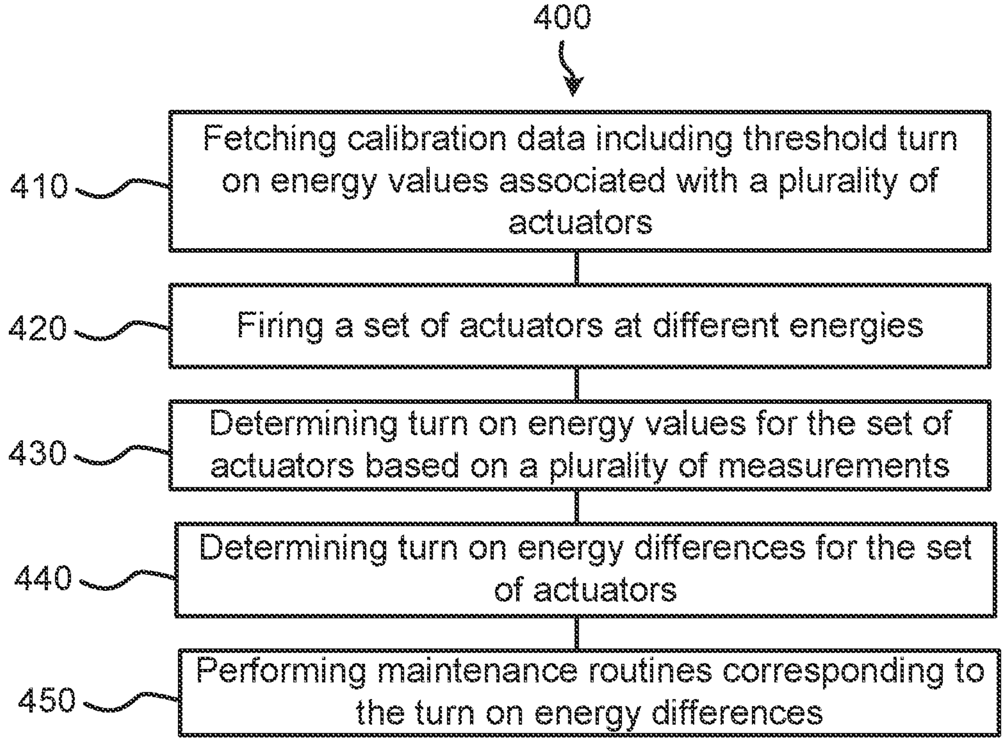
FIG. 4 shows a method for performing maintenance routines, according to an example of the present disclosure.

Referring now to FIG. 4, a method 400 for performing maintenance routines in view of turn on energy differences determined for a set of actuators is shown. Method 400 may be performed, for instance, during a servicing operation of a printhead assembly including a plurality of actuators and a plurality of chamber sensors. However, alternative times for conducting method 400 may be possible, such as over a startup operation of the printhead assembly or in between print jobs of a printing system including the printhead assembly.

At block 410, method 400 comprises fetching calibration data including threshold turn on energy values associated with a plurality of actuators (e.g., actuators 111*a*, 111*b*, and 111*c* in FIG. 1). To fetch the calibration data, block 410 may comprise reading the calibration data from a memory, receiving the calibration data from an external device, or accessing a server and obtaining the calibration data therefrom.

At block 420, method 400 comprises firing a set of actuators of the plurality of actuators at different energies, each of the actuators being associated with a respective chamber sensor (e.g., chamber sensors 112*a*, 112*b*, and 112*c* in FIG. 1). In an example, block 420 may comprise firing the set of actuators at firing energies in a range defined between a threshold turn on energy value and a max turn on energy value. In some examples, the max turn on energy value may correspond to a maximum admissible turn on energy value at which the firing of an actuator can be fired without compromising its future performance. On the other hand, the threshold turn on energy value may correspond to the firing energy associated with the effective firing of an actuator which does not experience an abnormal operation.

At block 430, method 400 comprises determining turn on energy values for the set of actuators based on a plurality of measurements measured via the chamber sensors associated with the set of actuators at the different energies. In some examples, determining turn on energy values for the set of actuators may comprise determining minimum firing energies at which firing of the set of actuators creates drive bubbles big enough to dispense drops of printing fluid through nozzles associated with the set of actuators, and identifying, for each of the fired actuators, the respective minimum firing energy as its respective turn on energy value.

Then, at block 440, method 400 comprises determining turn on energy differences for the set of actuators based on the turn on energy values determined for the set of actuators at block 430 and the threshold turn on energy values associated with the set of actuators obtained at block 410.

At block 450, method 400 comprises performing maintenance routines corresponding to the turn on energy differences determined at block 440. As previously explained, the maintenance routines may comprise firing actuators, transmitting signals indicative of printhead replacement, or a combination thereof.

In some examples, the set of actuators to be fired at block 420 may be selected based on a selection criterion. In some examples, the selection criterion may be a number of firings by the actuators over their lifespan. In other examples, the selection criterion may be a time since the last printing fluid dispensing operation. In other examples, the selection criterion may be the type of the actuator. In an example, method 400 may further comprise determining, for each actuator of the plurality of actuators, a number of based on historical firing data, and selecting the set of actuators from the plurality of actuators based on the determined number of firings. In some examples, the calibration data obtained at block 410 may further comprise the historical firing data for the plurality of actuators.

In other examples, the calibration data fetched at block 410 of method 400 may further comprise max turn on energy values for the plurality of actuators indicative of an excessive degradation of the plurality of actuators. As previously explained, in some examples, the future performance of an actuator may be compromised when the determined turn on energy value is greater than a max turn on energy value. In an example, performing maintenance routines corresponding to the turn on energy differences at block 450 may further comprise comparing the determined turn on energy values to max turn on energy values associated with the set of actuators, and identifying a need to replace printheads based on the comparison.

Figure 5:
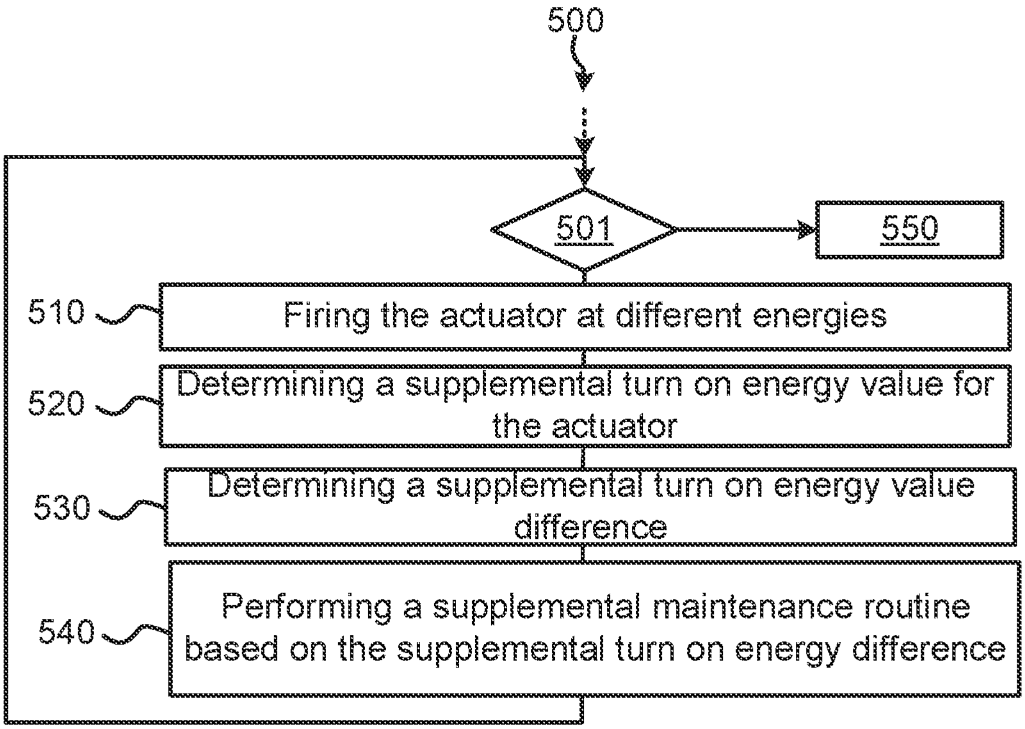
FIG. 5 shows a method for performing supplemental maintenance routines in an actuator, according to an example of the present disclosure.

Referring now to FIG. 5, a method 500 for performing supplemental maintenance routines is shown. As previously explained, in some examples, supplemental maintenance routines may have to be carried out to recover an actuator experiencing an abnormal performance. At block 501, method 500 comprises comparing a number of supplemental maintenance routines of an actuator of the set actuators to a predetermined number of supplemental maintenance routines. While the number of supplemental maintenance routines of an actuator of the set of actuators is lower than the predetermined number of supplemental maintenance routines, method 500 further comprises performing blocks 510 to 540. On the other hand, when the number of supplemental maintenance routines is equal to the predetermined number of supplemental maintenance routines, method 500 comprises performing block 550. In some examples, method 500 may be carried out as part of the methods previously explained in reference to FIG. 4, as indicated by the dashed arrow towards block 501 in FIG. 5. In some examples, the predetermined number of supplemental maintenance routines may be associated with a time available in between print jobs, a time available in between subsequent passes, or a time available during a startup operation of a printing system.

At block 510, method 500 comprises firing the actuator at different energies. At block 520, method 500 comprises determining a supplemental turn on energy value for the actuator based on a supplemental plurality of measurements via the sensor associated with the actuator and the different energies. Then, at block 530, method 500 comprises determining a supplemental turn on energy for the actuator based on the supplemental turn on energy value and the threshold turn on energy value associated with the actuator. Then, at block 540, method 500 comprises performing a supplemental maintenance routine involving firing the actuator based on the supplemental turn on energy value.

Upon blocks 510 to 540 are performed, method 500 comprises comparing the number of supplemental maintenance routines of the actuator to the predetermined number of maintenance routines at block 501. If the number of routines is lower than the predetermined number of maintenance routines, method 500 comprises performing blocks 510 to 540. However, responsive to determining that the number of supplemental maintenance routines is equal to the predetermined number of supplemental maintenance routines, method 500 comprises exiting the loop at block 550.

In some examples, block 550 of method 500 may comprise additional actions based on the supplemental turn on energy value determined at block 520. In an example, block 550 may comprise setting the supplemental turn on energy value determined at block 520 as a reference turn on energy value for the actuator responsive to determining that the number of supplemental maintenance routines of the actuator is equal to the predetermined number of supplemental maintenance routines. As previously explained, actuators may experience oxidation. Presence of oxidation in the actuator may result in a lower efficiency, thereby leading to a lack of printing fluid drops when being fired at the threshold turn on energy value. Hence, by adjusting the reference turn on energy value to the supplemental turn on energy value determined at block 520, the firing energy used in a firing of the actuator will be calibrated such that the firing results in a creation of a drive bubble big enough to dispense printing fluid drops, thereby reducing image quality defects in upcoming printing fluid dispensing operations.

In some examples, method 500 may further comprise modifying a firing energy at which the supplemental maintenance routine is to be carried out at block 540. As previously explained, actuators experiencing kogation may be recovered by firing the actuator at an over energy level with respect to its threshold turn on energy value. To prevent the actuator from being damaged because of firings at high energy levels, an over energy level at which the actuator is to be fired may be incrementally increased. In some examples, performing the supplemental maintenance routine at block 540 comprises increasing an over energy level associated with the actuator to obtain a subsequent over energy level, and firing the actuator at the subsequent over energy level. As a result, an overall number of firings of the actuators at high energies is reduced, thereby extending the lifespan of the actuator with respect to firing an actuator a predetermined number of times at high energies. In some other examples, instead of incrementally increasing the over energy level, the number of firings at higher energy may be incrementally increased.

In some other examples, block 501 may comprise determining a time available for performing a supplemental maintenance routine for an actuator and comparing the determined time available to a threshold time associated with the supplemental maintenance routine. Then, based on the comparison, method 500 may comprise performing blocks 510 to 540 or block 550. In an example, if the time available is greater than the threshold time, method 500 comprises performing blocks 510 to 540. On the other hand, if the time available is lower than the threshold time, method 500 comprises performing block 550.

In some other examples, method 500 may further comprise identifying a need to replace printheads based on the turn on energy values determined for the actuators part of the printhead. In an example, an actuator part of a printhead may be considered as defective upon the determined turn on energy value exceeds a max turn on energy value which may correspond to a maximum admissible turn on energy value at which the firing of an actuator can be fired without compromising its future performance. In some examples, method 500 may further comprise identifying a need to replace a printhead upon the supplemental turn on energy values of a predetermined number of actuators of the printhead is greater than a max turn on energy value.

Figure 6:
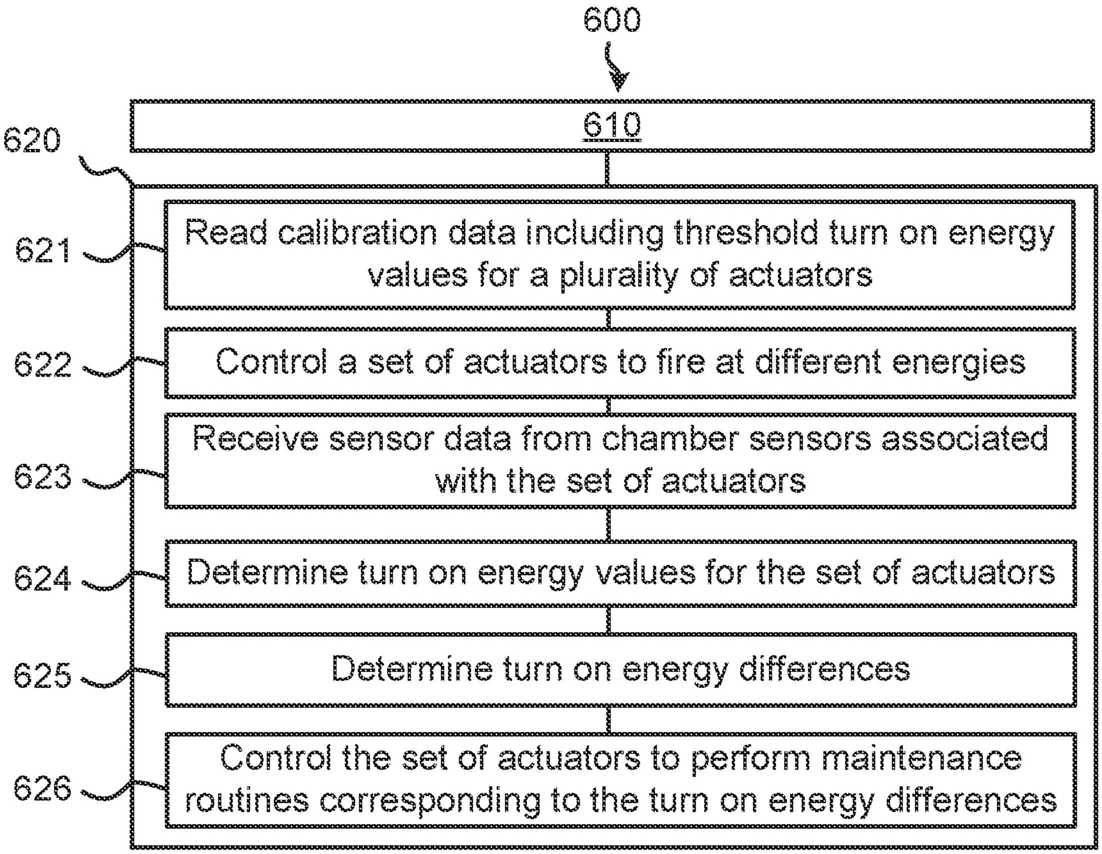
FIG. 6 shows a device comprising a processor and a memory including instructions, according to an example of the present disclosure.

Referring now to FIG. 6, a device 600 including a processor 610 and memory 620 operatively connected to the processor 610 is shown. The memory 620 comprises a plurality of instructions 621 to 626 that, when executed by the processor 610, cause the processor 610 to perform operations. In an example, the memory 620 of the device 600 may correspond to a computer-readable medium. Examples of computer-readable media include, for example, electronic, magnetic, optical, electromagnetic, or semiconductor media. Other examples of suitable computer-readable media include a hard drive, a random access memory (RAM), a read-only memory (ROM), memory cards and sticks and other portable storage devices.

Memory 620 of the device 600 comprise a first instruction 621, a second instruction 622, a third instruction 623, a fourth instruction 624, a fifth instruction 625, and a sixth instruction 626. The first instruction 621, when executed by the processor 610, causes the processor 610 to read calibration data including threshold for a plurality of actuators (e.g., actuators 111*a*, 111*b*, and 111*c* in FIG. 1). As previously explained, the plurality of actuators is part of a printhead assembly (e.g., printhead assembly 110, 210, 310 in FIGS. 1 to 3), wherein the printhead assembly may comprise one or more printheads. The second instruction 622, when executed by the processor 610, causes the processor 610 to control a set of actuators of the plurality of actuators to fire at different energies. The third instruction 623, when executed by the processor 610, causes the processor 610 to receive sensor data from chamber sensors (e.g., chamber sensors 112*a*, 112*b*, and 112*c* in FIG. 1) associated with the set of actuators. In some examples, the chamber sensors may comprise drive bubble sensors operatively connected to drive bubble circuitries, the drive bubble sensors being to send to the processor sensor data including a plurality of impedance values obtained over the firing at the different energies.

As previously explained, a turn on energy difference may be indicative of a condition of an actuator. The fourth instruction 624, when executed by the processor 610, causes the processor 610 to determine turn on energy values for the set of actuators based on the sensor data. In some examples, determine turn on energy values may comprise determine a minimum firing energy that generates a healthy drive bubble based on the measurements by the chamber sensors. Then, the fifth instruction 625, when executed by the processor 610, causes the processor 610 to determine turn on energy differences for the set of actuators based on the turn on energy values determined for the set of actuators and the threshold turn on energy values for the set of actuators. The sixth instruction 626, when executed by the processor 610, causes the processor 610 to control the set of actuators to perform maintenance routines corresponding to the turn on energy differences. Examples of maintenance routines comprise firing actuators, transmitting signals indicative of printhead replacement, or a combination thereof.

In some examples, the set of actuators may be selected in accordance with a selection criterion. In an example, the selection criterion may be a number of firings of the actuators since insertion of a printhead including an actuator, a time elapsed since insertion of a printhead including an actuator, a time elapsed since the last firing, and a type of actuator. Accordingly, in some examples, the memory 620 may comprise further instructions to cause the processor 610 to select the set of actuators from a plurality of actuators based on a selection criterion in accordance with at least one of the above-mentioned examples.

In some other examples, maintenance routines may be selectively performed based on the determined turn on energy differences. In an example, the execution of the sixth instruction 626 may cause the processor 610 to determine types of maintenance routine for sub-sets of actuators based on the respective turn on energy differences and control the sub-set of actuators to selectively perform the determined types of maintenance routines. In some examples, different turn on energy difference ranges associated with different types of maintenance routines may be defined.

In some other examples, methods 400 and 500 and the examples thereof may be defined as instructions executable by the processor 610. Accordingly, memory 620 of the device 600 may comprise additional instructions to cause the processor 610 to execute operations previously explained in reference to FIGS. 4 and 5.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A method comprising:

fetching calibration data including threshold turn on energy values associated with a plurality of actuators;

firing a set of actuators of the plurality of actuators at different energies, each of the actuators being associated with a respective chamber sensor;

determining turn on energy values for the set of actuators based on a plurality of measurements measured via the chamber sensors associated with the set of actuators at the different energies;

determining turn on energy differences for the set of actuators based on the turn on energy values determined for the set of actuators and the threshold turn on energy values associated with the set of actuators; and performing maintenance routines corresponding to the turn on energy differences, the maintenance routines comprising firing actuators, transmitting signals indicative of printhead replacement, or a combination thereof.

2. The method of claim 1, wherein while a number of supplemental maintenance routines of an actuator of the set of actuators is lower than a predetermined number of supplemental maintenance routines, the method further comprises:

firing the actuator at different energies, determining a supplemental turn on energy value for the actuator based on a supplemental plurality of measurements at the different energies, determining the supplemental turn on energy value difference for the actuator based on the supplemental turn on energy value and the threshold turn on energy value associated with the actuator, and performing a supplemental maintenance routine involving firing the actuator based on the supplemental turn on energy value difference.

3. The method of claim 2, wherein performing the supplemental maintenance routine comprises:

increasing an over energy level associated with the actuator to obtain a subsequent over energy level, and firing the actuator at the subsequent over energy level.

4. The method of claim 2, wherein performing the maintenance routines comprises:

setting the supplemental turn on energy value as a reference turn on energy value for the actuator responsive to determining that the number of supplemental maintenance routines of the actuator is equal to the predetermined number of supplemental maintenance routines.

5. The method of claim 1, further comprising:

determining, for each actuator of the plurality of actuators, a number of firings based on historical firing data; and selecting the set of actuators from the plurality of actuators based on the determined number of firings.

6. The method of claim 1, wherein the calibration data further comprises a plurality of max turn on energy values indicative of an excessive degradation of the plurality of actuators, and performing maintenance routines corresponding to the turn on energy differences comprises:

comparing the turn on energy values determined for the set of actuators to max turn on energy values associated with the set of actuators; and identifying a need to replace printheads based on the comparison.

7. A printing system comprising:

a printhead assembly comprising:

a plurality of actuators, and a plurality of chamber sensors, each of the chamber sensors being associated with a respective actuator; and a controller to:

read calibration data including threshold turn on energy values for the plurality of actuators;

control a set of actuators of the plurality of actuators to fire at different energies;

receive sensor data including a plurality of measurements at the different energies from the chamber sensors associated with the set of actuators;

determine turn on energy differences for the set of actuators based on the sensor data and the threshold turn on energy values associated with the set of actuators; and execute maintenance routines corresponding to the turn on energy differences, the maintenance routines comprising firing actuators, transmitting signals indicative of printhead replacement, or a combination thereof.

8. The printing system of claim 7, wherein the printhead assembly comprises a plurality of printheads, each printhead comprising at least one actuator of the plurality of actuators and at least one chamber sensor of the plurality of chamber sensors.

9. The printing system of claim 7, wherein while a supplemental turn on energy value of an actuator is greater than a threshold turn on energy value associated with the actuator, the controller is further to:

control the actuator to fire at different energies, receive supplemental sensor data including a supplemental plurality of measurements at the different energies, based on the supplemental sensor data, determine a supplemental turn on energy difference with respect to the threshold turn on energy value associated with the actuator, and execute a supplemental maintenance routine involving firing the actuator and corresponding to the supplemental turn on energy difference.

10. The printing system of claim 9, wherein upon the actuator executes a predetermined number of supplemental maintenance routines, the controller is further to:

modify the calibration data, wherein modifying the calibration data comprise setting the supplemental turn on energy value as the threshold turn on energy value associated with the actuator, or identify a printhead of the printhead assembly including the actuator as a to-be-replaced printhead upon the supplemental turn on energy values of a threshold number of actuators of the printhead is greater than a max turn on energy value.

11. The printing system of claim 7, wherein each of the chamber sensors comprises a drive bubble sensor to measure impedance values and a drive bubble circuitry to send the sensor data to the controller, and wherein the controller to determine turn on energy differences for the actuators based on the sensor data and the threshold turn on energy values associated with the set of actuators comprises:

determine turn on energy values for the set of actuators based on impedance values measured by the drive bubble sensors at the different energies of the actuators, and determine the turn on energy differences for the set of actuators based on the turn on energy values and the threshold turn on energy values associated with the set of actuators.

12. The printing system of claim 7, wherein the controller to execute maintenance routines based the turn on energy differences comprises the controller to:

control a first sub-set of actuators having the turn on energy difference within a first range of turn on energy difference to fire at an over energy level, control a second sub-set of actuators having the turn on energy difference within a second range of turn on energy values to fire at the threshold turn on energy values associated with the second sub-set of actuators, and issue a printhead replacement signal for printheads including a third sub-set of actuators having the turn on energy difference within a third range of turn on energy values, wherein the first range, the second range, and the third ranges of values are different.

13. A non-transitory computer-readable medium comprising instructions that, when executed by a processor, cause the processor to:

read calibration data including threshold turn on energy values for a plurality of actuators;

control a set of actuators of the plurality of actuators to fire at different energies;

receive sensor data from chamber sensors associated with the set of actuators, the sensor data including a plurality of measurements at the different energies;

determine turn on energy values for the set of actuators based on the sensor data;

determine turn on energy differences for the set of actuators based on the turn on energy values and the threshold turn on energy values associated with the set of actuators; and control the set of actuators to perform maintenance routines based on the determined turn on energy differences, the maintenance routines comprising firing actuators, transmitting signals indicative of printhead replacement, or a combination thereof.

14. The non-transitory computer-readable medium of claim 13, wherein the instructions further cause the processor to:

select the set of actuators from a plurality of actuators based on a selection criterion, the selection criterion including at least one of a number of firings since insertion of a printhead including an actuator, a time elapsed since insertion of a printhead including an actuator, and a type of actuator.

15. The non-transitory computer-readable medium of claim 13, wherein control the set of actuators to perform maintenance routines based on the determined turn on energy differences comprises:

determine types of maintenance routine for sub-sets of actuators based on the respective turn on energy differences; and control sub-sets of actuators to selectively perform the types of maintenance routines.

* * * * *